US006198176B1

(12) United States Patent
Gillette (10) Patent No.: US 6,198,176 B1
(45) Date of Patent: Mar. 6, 2001

(54) UPS/CPS SYSTEM (75) Inventor: Stephen Gillette, The Woodlands, TX (US)

(73) Assignee: Statordyne LLC, Kansas City, MO (US)

( * ) Notice: Subject to any disclaimer, the term of this patent is extended or adjusted under 35 U.S.C. 154(b) by 0 days.

(21) Appl. No.: 09/250,456

(22) Filed: Feb. 16, 1999

(51) Int. Cl.⁷ .................................................. H02J 9/06
(52) U.S. Cl. .......................... 307/64; 307/67; 307/68; 318/140; 318/153
(58) Field of Search ................... 307/64, 67, 68; 310/153; 318/150, 161, 140, 141; 322/4, 11, 40

(56) References Cited

U.S. PATENT DOCUMENTS

| | | | |
|---|---|---|---|
| 4,035,659 | * 7/1977 | Jeppson | 322/4 |
| 5,198,698 | * 3/1993 | Paul et al. | 307/68 |
| 5,646,458 | * 7/1997 | Bowyer et al. | 307/67 |
| 6,133,716 | * 10/2000 | Schutten | 307/64 |

* cited by examiner

Primary Examiner—Albert W. Paladini
(74) Attorney, Agent, or Firm—Oppenheimer Wolff & Donnelly LLP (57) ABSTRACT

An improved UPS/CPS system employs a high-efficiency uninterrupted power supply function integrated with an engine-generator set that combines both short term protection against momentary power interruptions with longer term power generation. Feedback from a controller provides for improved voltage regulation during abrupt load changes and flexibility of application. A number of features and operating modes are disclosed. In one embodiment, the system is useful as a kit to retrofit existing backup power facilities.

55 Claims, 2 Drawing Sheets

FIG. 1

|  | NORMAL MODE | RIDE-THRU MODE | GENERATOR MODE | OUT OF SERVICE |
|---|---|---|---|---|
| UCB (16) POSITION | CLOSED | OPEN | OPEN | CLOSED |
| SCB (22) POSITION | CLOSED | CLOSED | CLOSED | OPEN |
| GCB (51) POSITION | OPEN | OPEN | CLOSED | OPEN |
| GS/ENGINE (52) SPEED | 0 | 0 | 1,800 rpm | 0 |
| SMG (24) SPEED | 1,800 rpm | 1,800 rpm | 1,800 rpm | 0 |
| FLYWHEEL (35) SPEED | 3,600 rpm | 1,800–3,600 RPM | 3,600 rpm | 0 |

FIG. 2

UPS/CPS SYSTEM

BACKGROUND OF THE INVENTION

Many electrical loads can be adversely effected if their supply of electrical power is disrupted for even a fraction of a second. Uninterruptible Power Supply (UPS) systems are commonly used to prevent such disruption when the normal supply of electrical power fails or falters. These UPS systems use a temporary energy source, such as batteries or flywheels, to provide power to their protected load for a limited ride through time of from several seconds to several minutes. Some UPS systems are coordinated with a standby engine-generator set, whereby the gen-set is automatically started in the event that the failure of the incoming utility power line is not quickly restored. Typically, the engine-generator set is electrically connected on the utility side (or normal power supply side) of the UPS system, and a transfer switch is used to connect it to the input of the UPS system once the engine is started and up to normal operating speed.

Traditional battery-based static UPS systems, or even flywheel-based rotary UPS systems which use a motor-generator set, completely regenerate their input power in order to protect their loads. Therefore, if the engine-generator set is intended to supply power to the protected load through the UPS system, then it must be sized to provide for the additional parasitic losses of the UPS system that is in series with the protected load. Also, this combination of engine-generator set and UPS system will have a reduced ability to provide short circuit currents needed to isolate faults properly or to regulate voltage during abrupt changes to the protected load (such as from large motor starting or load switching). Control of this combination of gen-set and UPS system is, however, simple. For example, the UPS system has its own utility power disturbance analyzer, and is able to tell when utility power has failed. After a set time delay, it can issue a start command to the engine-generator set to begin its standby operation. The engine-generator set has its own automatic control scheme to start the engine, bring the engine up to normal operating speed, close the transfer switch, and thereafter adjust its own power frequency using a governor to control engine throttle. The engine-generator set governor and the UPS frequency control circuits can work independently. For example, if there is a step change in the protected load, the UPS system will automatically try to maintain load frequency regardless of its input frequency from the gen-set. The governor of the gen-set will respond to the change in electrical load requirement it sees from the UPS system by automatically increasing the engine throttle setting when the engine slows down due to the higher torque required. This is a stable control system.

There are three problems associated with the above combination of engine-generator set and traditional UPS system. First, the normal parasitic losses of series in-line UPS systems are inherently high; typically 90 to 92% efficiency. This equates to high operating cost over the life of the equipment. Second is that the standby engine-generator set must be oversized to account for this low operating efficiency. This equates to higher initial capital costs for the gen-set, plus higher operating costs while on standby. Third, the reduced ability to supply short circuit current for proper fault clearing, and to regulate voltage during abrupt load changes creates an application problem for such systems. This last issue is one of the reasons why traditional UPS systems are not normally used to protect industrial process circuits, where loads are constantly changing and large motors are often switched on and off.

Integrated rotary UPS and engine-generator systems are available to address some of these problems. Such systems include a synchronous motor generator which can be driven by a temporary energy source (such as a flywheel) for a short duration, or an integrally-mounted engine for long duration. In normal operation, the synchronous motor-generator (SMG) is connected to the utility line as a lightly loaded synchronous motor. When a utility disturbance is detected, a circuit breaker automatically opens to isolate both the SMG and the protected load from the utility supply. The temporary energy supply then mechanically drives the SMG so that it becomes a generator to supply power to the protected load. At the same time, the engine is automatically started, brought up to speed, and a clutch engaged to allow the engine to mechanically drive the SMG after the temporary energy source is depleted. Such an integrated systems is termed a Continuous Power Supply (CPS) system, as it is able to continue to supply power to the protected load long after the temporary energy source of a traditional UPS is exhausted.

These CPS systems address some of the problems inherent in the traditional UPS/engine-generator set combination, but add other disadvantages. First, the efficiency of the system is improved over the series in-line type of UPS system (typically 92 to 94%), but still represents a significant operating loss over the life of the equipment. For example, for each percentage point of inefficiency at a utility rate of 5 cents per kilowatt-hour, a 1000 kW machine will cost $35,000 to operate over ten years. Second, the engine and the SMG do not have to be oversized because, during standby, the protected load is supplied directly from the SMG. While the CPS has slightly higher short circuit capability, and therefore slightly better voltage regulation during abrupt load changes, it still does not have the full capability of a typical utility supply. Further, it has several limitations that often make its application impractical. One of these is that it is not practical to retrofit a CPS where there is an existing engine-generator set. The generator cannot be used, there may not be sufficient space to accommodate the larger CPS assembly, and reconnection of the existing engine is expensive. Another problem is lack of flexibility in applying the "UPS" function versus the "engine-generator set" function. For example, it is often desirable to protect only part of a facility's electrical load with a "UPS" function, but connect a much larger portion of the facility to the emergency standby power of an engine-generator set. These application problems are inherent in the integrated construction of the traditional CPS system.

SUMMARY OF THE INVENTION

Some aspects of this invention are to provide a high-efficiency UPS function that can be integrated with an engine-generator set resulting in a combination which has improved short circuit capability, improved voltage regulation during abrupt load changes, and flexibility of application. Accordingly, the invention utilizes a high-efficiency synchronous generator connected to a normal source of electrical power, temporary energy storage to drive this generator during initial loss of normal power, and a control system to coordinate power operation with an engine-generator set.

The synchronous generator is similar to a traditional generator, but can be rated and sized to carry the full load current need by a load for only a brief period of a few tens of seconds or minutes. Therefore, the generator can be of reduced mass and cost, and does not require the high-capacity fan construction normally needed to provide cooling at full rating for extended operation. The parasitic losses associated with the cooling fan are the largest single element of a generator's inefficiency; reducing these cooling requirements means that efficiencies of 95 to 97% can be attained under normal operation. A transient, temporary energy storage system is connected to the synchronous generator. In the preferred embodiment, this comprises a continuously variable transmission (CVT) which can transfer energy into and out of a spinning flywheel. This combination of generator, CVT and flywheel forms part of the Ride-Thru Module (RTM). However, as explained herein, other structures may take the place of the generator, CVT and flywheel combination to equivalently perform the functions of the RTM. During normal operation, the RTM is connected to the utility power supply through a disconnecting means such as a circuit breaker (any switch). Most of the power flows directly to the protected load, with only a small amount being used by the RTM to overcome friction, windage, and electrical losses in the generator and to maintain the flywheel at a pre-set rotational speed. When a disturbance in the utility power is detected, the circuit breaker is opened to isolate the RTM and the protected load. A feedback control system maintains the speed of the generator (and therefore the frequency of the protected load) by adjusting the ratio of the CVT to extract power from the spinning flywheel. If the utility power supply quickly returns to a stable condition (e.g., voltage magnitude, frequency and phase angle), the speed and angle of rotation of the generator are adjusted until the voltages of the utility power supply and the RTM are in synchronism, at which time the circuit breaker is closed. The control system then adjusts the CVT to take a small amount of power from the utility supply to accelerate the flywheel back to its preset energy storage value.

If the utility power supply does not quickly return to a stable condition, a control command is sent to start the engine-generator set, and a second circuit breaker connects the RTM in parallel with the gen-set as soon as they are in synchronism. An important element of the invention is the control of the two generators, which are now operating in parallel; in effect magnetically linking the flywheel and the engine through two generators and the CVT. When there is an abrupt change in the protected load, both generators will supply power. This effectively doubles the short circuit capability and greatly enhances voltage control. In addition, the flywheel and control system in the RTM are able to maintain frequency control much better than the engine alone. For example, diesel engines typically have a one-second response characteristic, while the flywheel and CVT are about ten times faster, or a complete order of magnitude. The control system of the invention uses the flywheel and CVT to control RTM frequency (and therefore engine-generator set frequency) and uses the engine to provide torque when needed (and therefore the long-term power supply).

DESCRIPTION OF THE PREFERRED EMBODIMENT

Figure 1:
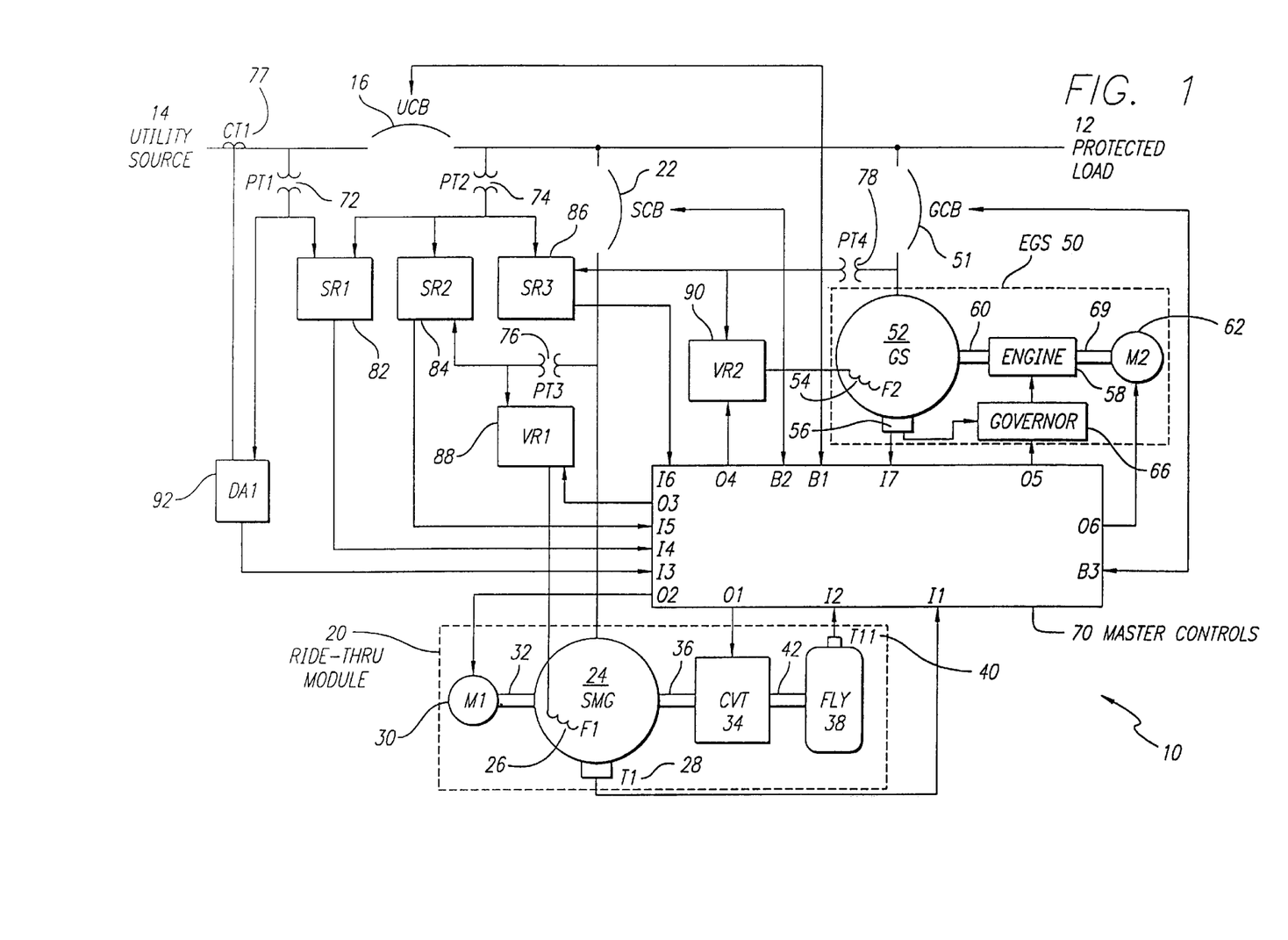
FIG. 1 is a diagram of one embodiment of the present invention.

A single-line diagram of one preferred embodiment of a system utilizing the teachings of the subject invention is shown in FIG. 1. In FIG. 1, a UPS/CPS system 10 has the protected load 12 connected to the utility source 14 through circuit breaker (UCB) 16. A ride-through module (RTM) 20 is connected to the protected load 12 through circuit breaker (SCB) 22, and is mechanically separate from a second module termed the engine generator set (EGS) 50. The combination of generator, continuously variable transmission (CVT) and flywheel is termed the Ride-Thru Module (RTM). Other structures, however, may take the place of the generator, CVT and flywheel combination to equivalently perform the functions of the RTM. For example, the CVT, which is controlled by a master controller 70, is used to control the speed of the synchronous motor-generator (SMG) 24 when driven by the flywheel 38, and in this way controls the magnitude, frequency and relative phase angle of the voltage and current phasors (i.e., power) generated by SMG 24. But from the teachings of the present invention a suitable power switching circuit using power semiconductor switches (e.g. SCR's) could be constructed to control the phasor output of SMG 24, which could be of an alternate construction. Further, the master controller 70 and voltage regulator 88 can control the electric power output via the field windings 26 as explained further herein. With suitable technology, the flywheel 38 may be replaced by any device to store potential energy, such as a rechargeable battery, fuel cell, compressed gas, or a spring wound device, that provides shaft power to drive SMG 24. The potential energy storage device in RTM 20 should have the ability to provide energy to the protected load 12 much faster, in response to an interruption of power, than the energy supplied by the engine generator-set (EGS) module 50.

The RTM 20 forms an independent power reserve supply to the power reserve supply formed by the engine generator-set (EGS) module 50. The two modules, RTM 20 and EGS module 50, are mechanically separate, each having their own generators, and are only electro-magnetically linked through the master controller 70. The RTM 20 is continuously connected to the utility source power supply 14, and, by nature of the transient, temporary energy storage device such as flywheel 38, has a faster response time in supplying adequate power (e.g. suitably conditioned power that can be used at the protected load) to the protected load 12, in an event of an interruption of power, than does EGS 50, which stores a more permanent supply of energy that is not as readily available. However, the EGS 50 is needed because there is greater electric power stored, or more precisely, capable of being generated, by EGS 50 than by RTM 20. RTM 20 derives the bulk of its energy stored from utility source 14, and does not generate its power from a reserve (e.g., as in a fossil fuel reserve powering EGS 50). As a consequence, RTM 20 is used as a transient source of power until such time that EGS 50 can be activated and become available to supply energy to the protected load 12 (hence the suggestion of the term "ride-through" module). Further, the RTM 20 replenishes its power supply from the utility source, and both inputs and outputs energy from the utility power supply (i.e., acts as a source or a sink), whereas in one embodiment the EGS 50 only outputs energy (acts as a source). Master controller 70 forms the intelligence to link RTM 20 with EGS 50 and with the rest of the circuit components of the system, and to coordinate the components for the smooth transfer of power between components and the monitoring and maintaining of properly conditioned power between the utility source 14 and protected load 12.

The RTM 20 consists of a synchronous motor-generator (SMG) 24 with rotor field 26 and speed sensor or tachometer 28, pony motor 30 connected to synchronous motor-generator 24 via shaft 32, continuously-variable transmission 34 connected to synchronous motor-generator 24 through shaft 36, and flywheel 38 with speed sensor or tachometer 40 connected to shaft 42 of the continuously variable transmission 34. The synchronous generator 24 is similar to a traditional generator, but can be rated and sized to generate and carry the maximum full load current that may be needed by a protected load 12 for only a brief predetermined period, typically tens of seconds or a few minutes (e.g., less than 10 continuous minutes at any given time). The generator 24 of the RTM 20 would also thus be smaller, and rated to carry less continuous current, than the generator 52 of the gen-set 50. Therefore, the generator 24 can be of reduced mass and cost, and does not require the high-capacity fan construction normally needed to provide cooling at full rating for extended operation.

Figure 2:
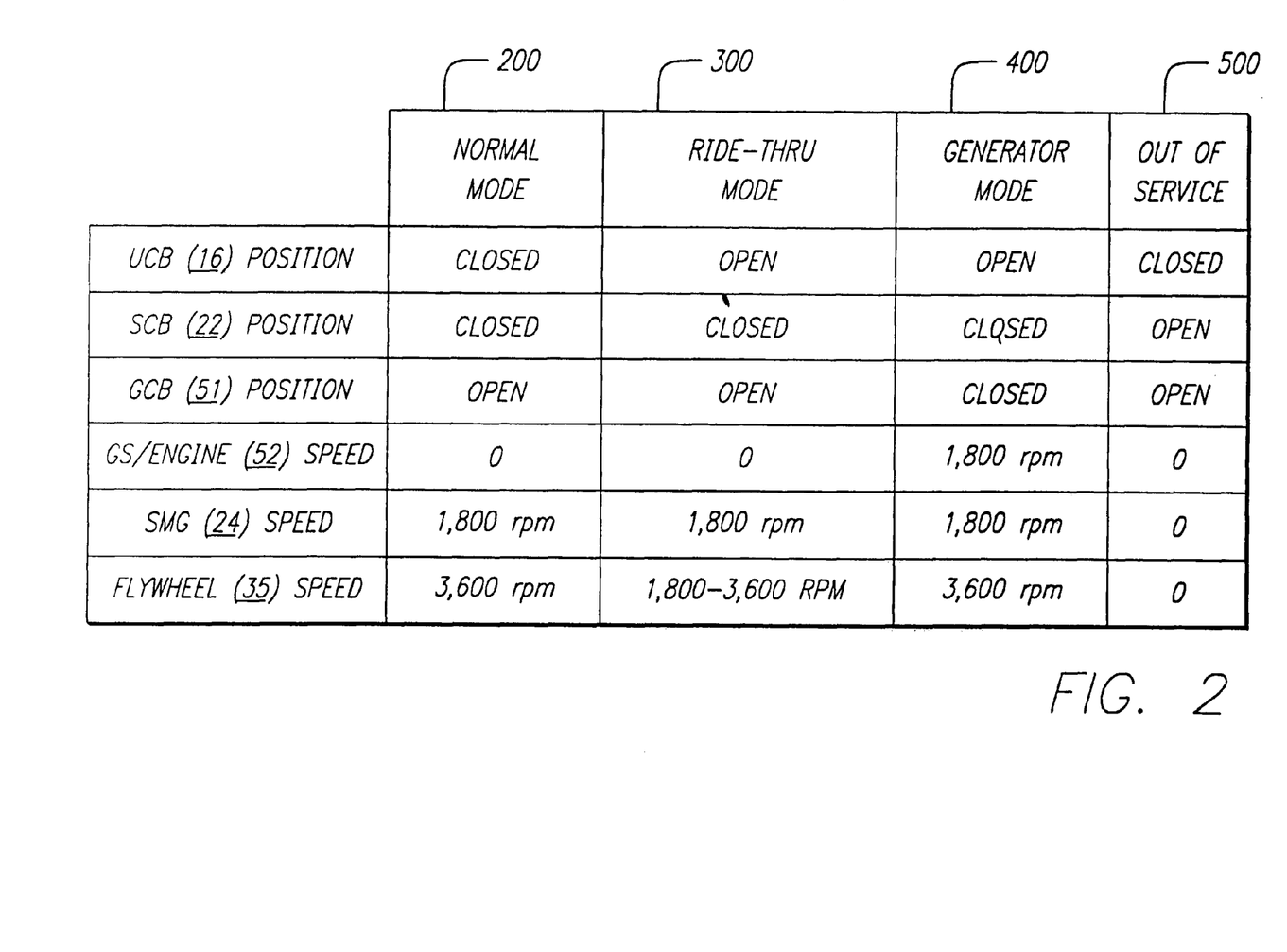
FIG. 2 is a table of different operating modes.

As shown an engine generator-set (gen-set) 50 is connected to the load through circuit breaker (GCB) 51. The engine generator-set 50 consists of synchronous generator 52 with rotor field 54 and speed sensor or tachometer 56, engine 58 connected to generator 52 through shaft 60, starter motor 62 connected to engine 58 through shaft 69, and governor 66 connected to the throttle of engine 58 and receiving input signals from the speed sensor 56 and master controller 70. The engine driving the gen-set is preferably an internal combustion motor engine having a throttle but may be any prime mover that produces shaft power. Master controller 70 is able to receive analog and discrete inputs, provide automated logic control, accept manual control through a man-machine interface (not shown), and provide automated closed-loop feedback control as is described herein. Master controller 70 has many of the features of a microprocessor and may be replaced by a microprocessor or other suitable circuitry that emulates its functions. Other functional elements of the system are included to simplify explanation of operation, but are not required to be separate devices. These include potential transformers 72, 74, 76 and 78, current transformer 77, synchronizing relays 82, 84 and 86, voltage regulators 88 and 90, and utility disturbance analyzer 92. Refer to FIG. 2 for the operating modes of the system.

The normal operating mode of the system is defined by the parameters shown under the column Normal Mode 200 of FIG. 2. In this mode, the protected load 12 is receiving power from the utility source 14 through circuit breaker 16, which is closed. The ride-thru module (RTM) 20 is connected to the utility source 14 and the protected load 12 through circuit breaker 22, which is closed (circuit breaker 22 being downstream of circuit breaker 16). The ride-thru module's synchronous motor-generator 24 is rotating at synchronous speed with the utility source 14 frequency, and the flywheel 38 is rotating at a speed representing its preset energy storage value. The master controller 70 uses input I2 from speed sensor 40 to determine the speed of the flywheel 38, and compares this input value to the preset energy storage value in its memory. Any error signal in this comparison is used to control the speed ratio of the continuously-variable transmission 34 through output O1 to adjust the speed of the flywheel up or down, as needed. The master controller 70 provides an output O3 to the voltage regulator 88 to indicate that it should operate to regulate voltage of the ride-thru module's synchronous motor-generator 24 to its preset value. The voltage regulator 88 then measures voltage of the protected load 12 through potential transformer 76, and adjusts the current to field winding 26 of the ride-thru module's synchronous motor-generator 24 to maintain that preset value. In this way, voltage is controlled at the protected load 12 to improved accuracy compared to the utility source 14 alone. It as also possible to have the voltage regulator 88 control the current to the rotor field 26 based on the measured or derived power factor of the utility source 14 or power factor of the protected load 12 (use of a synchronous motor-generator in this way is well known in the art per se, as a synchronous condenser). The engine generator-set 50 is not operating, and is isolated from the protected load 12 and the utility source 14 by circuit breaker 51, which is open.

The system will remain in the Normal Mode 200 described above as long as the utility source 14 continues to meet specific performance criteria. The disturbance analyzer 92 monitors the current and voltage of the utility source 14 using current transformer 77 and potential transformer 72, respectively. Both of these phase and voltage measuring instruments are upstream of circuit breaker 16, and are ultimately sampled, by the master controller 70 acting through the disturbance analyzer 92 and synchronous relays 82, 84, 86. The disturbance analyzer 92 compares utility source 14 voltage to preset high and low limits, and sends a signal to input I3 of the master controller 70 when voltage is outside these limits. The analyzer 92 may also calculate other utility source 14 power quality indicators from the current and voltage inputs, such as frequency and direction of power flow, and accordingly issue a signal to input I3 of the master controller 70 when values fall outside of preset limits.

When master controller 70 senses a signal at its input I3, indicating a current or voltage value outside the present limit of the disturbance analyzer 92, it initiates a control program which does the following. First, a command is given through input/output B1 to open circuit breaker 16. At the same time the feedback control of the continuously-variable transmission 34 is reversed so that energy is taken from the flywheel 38, to drive synchronous motor-generator 24 at a constant speed. This is accomplished by comparing the output from speed sensor 28 at input I1 of the master controller 70 with a preset value stored in memory. This resulting error signal is then used to drive output O1 in order to control the speed ratio of continuously-variable transmission 34. During this mode of operation, the synchronous motor-generator 24 is now acting as a generator, and the voltage regulator 88 continues to adjust the current to field winding 26 in order to maintain the desired output voltage from synchronous motor-generator 24. Further, it can be appreciated from the teachings herein that the flywheel 38 may be replaced by any transient, temporary energy source, such as a chemical battery, fuel cell, wound spring, compressed gas container or other potential energy storage device, having a response rate for supplying energy to the protected load that is faster, in response to an interruption of power, than the energy supplied by the EGS 50 module. In this way, the ride-thru module 20 is able to continue supplying power to the protected load 12 even though the utility source 14 power supply has become unreliable. This Ride-Thru Mode 300 of operation will continue until one of the below following conditions is met.

I. The utility source quickly returns to a stable condition

This is sensed by the disturbance analyzer 92, as measured voltage, within preset high and low limits for a defined amount of time (for example two seconds). When the disturbance analyzer 92 determines that utility source 14 power has returned to normal, it issues a command to input I3 of master controller 70. Master controller 70 then initiates a resynchronizing program sequence, which does the following. Synchronizing relay 82 compares the voltage signals from potential transformers 72 and 74, and provides a signal to input I4 of the master controller 70 which tells it both the magnitude of the voltage difference, as well as the phase angle difference, between the utility source 14 and the synchronous motor-generator 24 voltage waves. Using this information, the master controller 70 adjusts the speed (and therefore the frequency and relative phase angle) of the synchronous motor-generator 24 by adjusting the speed ratio of continuously-variable transmission 34 through output O1. Simultaneously, master controller 70 also adjusts the voltage magnitude of the synchronous motor-generator 24 to match the utility source 14 voltage by issuing control commands to voltage regulator 88 through output O3. When the voltage magnitude, frequency and relative phase angle of the synchronous motor-generator 24 and utility source 14 are within preset limits, as computed or as measured directly from instruments, indicating a return to a stable condition of the interrupted utility source, master controller 70 issues a so-called closed loop synchronizing close command to circuit breaker 16 through input/output B1. After circuit breaker 16 is closed, the master controller 70 reverts back to the Normal Mode 200 control program which then adjusts the output O1 to take energy from the utility source 14 to accelerate the flywheel 38 back to its preset energy storage speed.

II. The utility source does not return quickly to a stable condition.

Master controller 70 monitors the speed of the flywheel 38 using input I2 connected to speed sensor 40. If the flywheel 38 speed falls below a preset lower limit before an input from disturbance analyzer 92 is sensed at input I3 indicating that the utility source 14 has returned to stable conditions, the master controller 70 initiates a logic sequence to start the engine generator set 50. The flywheel speed lower limit could be set, for example, to allow sufficient remaining temporary energy storage for ten seconds of operation of the ride-thru module 20 at full rated power to the protected load 12. This is enough time for a diesel engine generator set to start, come up to synchronous speed, and take over the load from the RTM 20. The logic sequence to start the engine generator-set 50 will now be described. First, a start command is issued from master controller 70 output O6 to send power to starter motor 62 to turn the engine through shaft 64. The power source for this starter motor 62 is not shown, but it could be traditional batteries, DC power derived from the ride-thru module 20 using a transformer and rectifier, or a combination of both. Simultaneously, a signal is sent using output O5 to governor 66 to open the engine's throttle. The start signal O6 is shut off when sufficient engine rpm is sensed at input I7 from speed sensor 56. The governor 66 is given a setpoint from master controller 70 output O5 which represents a synchronous speed corresponding to the desired protected load 12 voltage frequency, and the governor 66 then brings the engine up to and maintains this speed. Controller output O4 then sends a signal to voltage regulator 90 to adjust the current in the rotor field 54 of engine generator 52 to provide a preset voltage measured by potential transformer 78. When the engine 58 is up to synchronous speed, the master controller 70 then initiates a synchronizing program sequence, which does the following. Synchronizing relay 86 compares the voltage signals from potential transformers 74 and 78, and provides a signal to input I6 of the master controller 70 which tells it both the magnitude of the voltage difference, as well as the phase angle difference, between the synchronous motor-generator 24 and the synchronous generator 52 voltage waves. Using this information, the master controller 70 adjusts the speed (and therefore the frequency and relative phase angle) of the synchronous motor-generator 24 by adjusting the speed ratio of continuously-variable transmission 34 through output O1. Simultaneously, master controller 70 also adjusts the voltage magnitude of the engine synchronous generator set 52 to match the ride-thru module's synchronous motor-generator 24 voltage by issuing control commands to voltage regulator 90 through output O4. When the voltage magnitude, frequency and relative phase angle of the synchronous motor-generators 24 and 52 are within preset limits, master controller 70 issues a close command to circuit breaker 51 through input/output B3. After circuit breaker 51 is closed, the master controller 70 reverts to the Generator Mode 400 control program, which then coordinates the entire system as described below.

The column Generator Mode 400 in FIG. 2 defines the parameters of the system while the protected load 12 is being supplied power from both the engine generator-set 50 and the ride-thru module 20. In this mode, the circuit breaker 16 is open, and both circuit breakers 22 and 51 are closed. This puts the synchronous motor-generators 24 and 52 in parallel, with both now able to supply power to the protected load 12. However, the ride-thru module 20 is only able to supply power for a short duration until the temporary energy stored in its flywheel 38 is exhausted. On the other hand, the ride-thru module 20 is able to react to changes in load levels much more quickly than the engine generator-set 50. To take advantage of these characteristics, the master controller 70 is designed to control system frequency through the ride-thru module 20, and long term power through the engine generator-set 50. This is accomplished as described below.

In Generator Mode 400, the master controller 70 monitors system frequency through input I1 from speed sensor 28 on synchronous motor-generator 24, and compares this value with a preset value stored in memory. This resulting error signal is then used to drive output O1 in order to control the speed ratio of continuously-variable transmission 34. The speed of flywheel 38 is monitored using speed sensor 40 through input I2, and master controller 70 compares this value to the preset energy storage value stored in its memory. The resulting error signal is then used to drive output O5 to adjust the setpoint of governor 66 to increase or decrease throttle position of engine 58. When the flywheel falls below its setpoint speed, this error signal causes the governor 66 to increase the throttle of engine 58 to supply torque to the system, and allows energy to be put back into the flywheel 38 of the ride-thru module 20. Thus, RTM 20 can either act as an energy source or act as an energy sink, dependent on whether the flywheel has sufficient stored energy.

Conversely, when the flywheel 38 speed exceeds the preset value, the resulting error signal will cause the output O5 to decrease the throttle position of the governor 66, thereby reducing energy input to the flywheel 38. This automatic control of continuously-variable transmission 34 and governor 66 will continue as long as the system is required to provide standby power.

The system will continue to operate in Generator Mode 400 until the utility source 14 returns to a stable condition and the engine 58 has run long enough to reach a stable operating condition (typically 20 minutes for a diesel engine). The master controller 70 will first set a timer for a preset delay to allow the engine to reach the desired operating condition, after which it will look to input I3 from disturbance analyzer 92 to see if the utility source 14 has returned to normal. When a signal is then received from disturbance analyzer 92, the master controller 70 will initiate a synchronizing sequence as follows. Synchronizing relay 82 compares the voltage signals from potential transformers 72 and 74, and provides a signal to input I4 of the master controller 70 which tells it both the magnitude of the voltage difference, as well as the phase angle difference, between the utility source 14 and the synchronous motor-generator 24 voltage waves.

Using this information, the master controller 70 adjusts the speed (and therefore the frequency and relative phase angle) of the synchronous motor-generator 24 by adjusting the speed ratio of continuously-variable transmission 34 through output O1. Simultaneously, master controller 70 also adjusts the voltage magnitude of the synchronous motor-generators 24 and 52 to match the utility source 14 voltage by issuing control commands to voltage regulators 88 and 90, respectively, through outputs O3 and O4, and adjusts output O5 to governor 66 to increase or decrease torque from the engine 58 to maintain the temporary energy storage level in flywheel 38.

When the voltage magnitude, frequency and relative phase angle of the synchronous motor-generator 24 and utility source 14 are within preset limits, master controller 70 issues a close command to circuit breaker 16 through input/output B1. As soon as circuit breaker 16 is closed, the master controller 70 issues an open command to circuit breaker 51, and reverts back to the Normal Mode 200 control program which then adjusts the output O1 to take energy from the utility source 14 to maintain the flywheel 38 at its preset energy storage speed. Simultaneously, a command is given to the engine governor 66 through output O5 to reduce throttle position to idle. After a preset cool-down time, another signal is sent to the governor to shutdown the engine 58. The system is now back in the Normal Mode 200.

The ride-thru module 20 can also be taken in and out of service. FIG. 2 shows the conditions for this Out of Service Mode 500. Thus, in the Out of Service mode the circuit breaker 16 is closed and circuit breakers 22 and 51 are open, and the generator/engine 52, SMG 24 and flywheel 38 are at an idle speed of zero. For example, from the Normal Mode 200 of operation, a command can be given to the controller through its man-machine interface (not shown) to open circuit breaker 22 through input/output B2, and switch off voltage regulator 88 through output O3. This will cause the ride-thru module 20 to lose power from the utility source 14, and it will simply coast down to the Out-of-Service Mode 500. To restart the system, a start command can be given to the master controller 70, which will cause the following sequence.

First, power is delivered to pony motor 30 through output O2 to accelerate the synchronous motor-generator 24 to normal operating speed. Master controller 70 then adjusts the speed ratio of continuously-variable transmission 34 through output O1 to bring flywheel 38 up to a preset start-up operating speed while pony motor 30 maintains the speed of the synchronous-motor generator 24. Note that this preset start-up speed does not need to equal the full temporary storage value, so the pony motor 30 does not have to be sized to provide the full parasitic losses of the ride-thru module 20 in Normal Mode 200. Once the flywheel 38 is at its preset start-up speed, the controller initiates a synchronizing sequence, which does the following. Synchronizing relay 84 compares the voltage signals from potential transformers 74 and 76, and provides a signal to input I5 of the master controller 70 which tells it both the magnitude of the voltage difference, as well as the phase angle difference, between the utility source 14 and the voltage waves of synchronous motor-generator 24.

Using this information, the master controller 70 adjusts the speed (and therefore the frequency and relative phase angle) of the synchronous motor-generator 24 by adjusting the speed ratio of continuously-variable transmission 34 through output O1. Simultaneously, master controller 70 also adjusts the voltage magnitude of the synchronous motor-generator 24 to match the utility source 14 voltage by issuing control commands to voltage regulator 88 through output O3. When the voltage magnitude, frequency and relative phase angle of the synchronous motor-generator 24 and utility source 14 are within preset limits, master controller 70 issues a close command to circuit breaker 22 through input/output B2. After circuit breaker 22 is closed, the master controller 70 reverts to the Normal Mode 200 control program which then shuts off power to the pony motor 30 and adjusts the output O1 to take energy from the utility source 14 to accelerate the flywheel 38 up to its full preset energy storage speed.

Many variations to the preferred embodiment will be evident to those skilled in the art. For example, the functions of the synchronizing relays and voltage regulators can be integrated into the master controller 70, as could the engine governor function. While circuit breakers are shown to provide connection to certain circuit elements, contactors or static switches could also be used. A bypass switch could be added to allow testing and maintenance of the entire system while still providing utility power to the load.

In addition, the foregoing preferred embodiment is particularly useful as a retrofit kit of parts comprising the components of the invention discussed herein, for retrofitting exiting facilities having backup power using getsets, because less disruption of the existing backup power facilities is required. Further, clearly separating the functions associated with "ride-hrough" (via RTM 20), from the functions associated with long-term standby power generation (via generator-set 50), results in long term savings as discussed above, and can further facilitate retrofitting.

Thus, the foregoing description of the invention is for illustration purposes, and changes in the details of the system may be made without departing from the true spirit of the invention. Therefore, the invention should only be limited by the following claims.

I claim:

1. A system for providing adequate power to an electrical load when a normal source of power has failed, comprising:
   a first module having a transient source of stored energy connected to a normal power source and an electrical load; said first module comprising a generator;
   a second module having a source of stored energy connected to said normal power source and said electrical load; said second module comprising a engine gen-set having a generator separate from said first module generator;
   a controller controlling and operatively connected to said first and second stored energy modules,
   said first module mechanically separate from said second module;
   wherein said first stored energy module has a faster response time in supplying energy to said electrical load than said second stored energy module, in response to an interruption in said normal source of power.

2. The system according to claim 1, wherein:
   said first module further comprises a continuously variable transmission, said transient stored energy source comprises a flywheel, said continuously variable transmission connecting said flywheel to said generator, said generator is a synchronous motor generator.

3. The system according to claim 1, further comprising:

a plurality of circuit breakers, said circuit breakers controlled by said controller.

4. The system according to claim 3, wherein:

said plurality of circuit breakers comprise a first circuit breaker connecting said normal power source and said electrical load, and a second circuit breaker connecting said first module to said electrical load and said normal power source.

5. The system according to claim 4, wherein:

said plurality of circuit breakers comprise a third circuit breaker connecting said second module to said electrical load.

6. The system according to claim 5, wherein:

said controller operates said system to control the flow of energy to and from said first and second modules, to operate said system in a plurality of different modes: a normal mode, a ride-thru mode, a generator mode, and an out-of-service mode, said modes actuated in said system by said controller.

7. The system according to claim 6, wherein:

said normal mode comprises said controller closing said first circuit breaker, said second circuit breaker, and opening said third circuit breaker.

8. The system according to claim 6, wherein:

said ride-thru mode comprises said controller opening said first circuit breaker and said third circuit breaker, and closing said second circuit breaker.

9. The system according to claim 6, wherein:

said generator mode comprises said controller opening said first circuit breaker, and closing said second and third circuit breakers.

10. The system according to claim 6, wherein:

said out-of-service mode comprises said controller closing said first circuit breaker, and opening said second and third circuit breakers.

11. The system according to claim 1, wherein:

said first module generator is a synchronous generator;

a continuously variable transmission in said first module, said synchronous generator of said first module driven through said continuously variable transmission by said transient source of stored energy;

said controller measuring and storing a value representing the stored energy available in said first module in a controller memory, said controller comparing said value representing the stored energy available in said first module to a preset energy storage value in said controller memory.

12. The system according to claim 11, further comprising:

a power disturbance analyzer operatively connected to said controller, said controller controlling said first module to supply power from said transient source of energy to said electrical load in response to an interruption of power measured by said power disturbance analyzer.

13. The system according to claim 12, further comprising:

a voltage regulator to adjust the current in the field windings of said synchronous motor-generator to maintain a desired output voltage from said synchronous motor-generator of said first module.

14. The system according to claim 13, further comprising:

means to sense the power factor of said protected load;

said voltage regulator adjusts current in said field windings based on said power factor.

15. The system according to claim 12, wherein:

said transient stored energy source is a flywheel, and said controller measures the available energy in said flywheel by measuring the speed of said flywheel.

16. The system according to claim 15, further comprising:

voltage and phase measuring instruments to measure the voltage and phase angle difference between said normal source of power and the power generated by said synchronous motor-generator of said first module, wherein said controller adjusts the voltage magnitude of said synchronous motor of said first module to maintain said voltage at said electrical load.

17. The system according to claim 16, further comprising:

a circuit breaker isolating said first module from said normal power source, and said voltage and phase measuring instruments are located upstream of said circuit breaker.

18. The system according to claim 17, wherein:

said voltage and phase measuring instruments are potential transformers.

19. The system according to claim 11, further comprising:

a plurality of circuit breakers, said circuit breakers controlled by said controller;

said controller measures at least one of the values of voltage magnitude, frequency and relative phase angle of said synchronous generator and said normal power source, and adjusts said voltage magnitude, frequency and relative phase angle of said synchronous generator of said first module through the control of said continuously variable transmission in said first module.

20. The system according to claim 19, wherein:

said controller issues a command to close one of said plurality of circuit breakers, and connect said normal power source to said electrical load, when at least one of said values of voltage magnitude, frequency and relative phase angle of said synchronous generator and said normal power source lie within a predetermined limit.

21. The system according to claim 1, further comprising:

a power disturbance analyzer operatively connected to said controller, said controller controlling said first module to supply suitable power from said transient source of energy to said electrical load in response to an interruption of power.

22. The system according to claim 21, wherein:

said controller measuring and storing a value representing the stored energy available in said first module in a controller memory, said controller comparing said value representing the stored energy available in said first module to a predetermined energy storage value in said controller memory;

said controller measuring said normal power source voltage, said said controller responding to said power disturbance analyzer to operate said engine gen-set, when said measured value representing stored energy available is less than said predetermined energy storage value.

23. The system according to claim 22, further comprising:

an instrument to measure at least one of the values of voltage, frequency and relative phase angle of at least one of said normal power source and said protected load;

said controller controls said engine gen-set to increase its power output when said value of stored energy available in said first module falls below a predetermined limit, and said controller controls the power output of one of said first and second modules to adjust the output in response to at least one of said values of voltage, frequency and relative phase angle.

24. The system according to claim 23, further comprising:
a speed sensor connected to said generator of said first module;
said controller monitors the frequency of said generator of said first module.

25. The system according to claim 23, wherein:
said first module further comprises a continuously variable transmission;
said controller measures the value of voltage frequency of said generator of said first module, and compares said voltage frequency value to a value stored by the controller;
said controller controlling the output of said generator of said first module through said continuously variable transmission, and the output of said engine gen-set, in response to said values representing the stored energy available in said first module and said value representing voltage frequency.

26. The system according to claim 25, wherein:
said transient stored energy source comprises a flywheel, and said generator is a synchronous motor generator.

27. The system according to claim 21, wherein:
said first module generator and said second module genset each have generators controlled by said controller;
said controller measures at least one of the values of the voltage, frequency and relative phase angle of said normal power source, and adjusts at least one of the values of the voltage, frequency and relative phase angle of said first and second module generators to match at least one of said measured values of voltage, frequency and relative phase angle of said normal power source.

28. The system according to claim 27, further comprising:
a first circuit breaker controlled by said controller, said first circuit breaker between said normal power source and said electrical load;
a second circuit breaker, controlled by said controller, disposed downstream between said first circuit breaker and said electrical load, connecting said first module and said electrical load;
a voltage measuring instrument measuring said voltage value of said normal power source, disposed upstream of said first circuit breaker, wherein,
said controller operates to close said first circuit breaker when said voltage magnitude of said normal power source matches the voltage magnitude of said first and second module generators.

29. The system according to claim 28, further comprising:
a frequency measuring instrument for measuring the frequency and phase of said normal power source, said frequency measuring instrument disposed upstream of said first circuit breaker; wherein
said controller controls the speed of said generator of said first module to adjust the frequency and relative phase angle of said first module, to match the frequency and phase of said normal power source, and,
said controller operates to close said first circuit breaker when said frequency and phase angle of said normal power source matches the frequency and phase angle of said first module generator.

30. The system according to claim 27, wherein:
said first module generator is asynchronous generator;
a continuously variable transmission in said first module, said synchronous generator of said first module driven through said continuously variable transmission by said transient source of stored energy, and,
said transient stored energy source is a flywheel.

31. The system according to claim 1, wherein:
said first module generator is a synchronous generator, said synchronous generator is sized to carry the maximum full load current needed by said protected load for a predetermined time lasting less than continuous minutes.

32. The system according to claim 31, further comprising:
a continuously variable transmission, and said transient stored energy source comprises a flywheel, said continuously variable transmission connecting said flywheel to said generator.

33. The system according to claim 32, wherein:
further comprising a pony motor connected to said synchronous motor generator of said first module; and
said controller measures the speed of said flywheel, and controls the electrical output of said synchronous generator of said first module by controlling the speed ratio of said continuously-variable transmission.

34. The system according to claim 33, wherein:
said second module comprises an engine gen-set, and further comprising a governor operatively connected to said engine gen-set and controlled by said controller, said second module further comprising a starter motor to start said engine gen-set.

35. The system according to claim 33, further comprising:
voltage and phase sensing instruments to sense the voltage and phase of said normal power source, said instruments sampled by said controller;
a first circuit breaker connecting said normal power source and said electrical load, and a second circuit breaker connecting said first module to said electrical load and said normal power source; wherein,
said controller initiates a synchronizing sequence to compare the voltage magnitude and phase of the voltage and frequency of said synchronous motor-generator of said first module and said normal power source, and said controller adjusting the speed of said synchronous motor-generator through said continuously-variable transmission until said voltages are within preset limits, said circuit breakers being selectively opened and closed in response to said controller.

36. A method of operation for an apparatus to provide suitable power to an electrical load when a normal supply of power has failed, comprising the steps of:
storing a first amount of energy in a first storage module connected in parallel to a normal power supply and an electrical load;
storing a second amount of energy in a second storage module connected in parallel to said normal power supply and said electrical load;
said first storage module mechanically separate from said second storage module;
wherein said first storage module has a faster response time in supplying energy to said electrical load, in response to an interruption in said normal supply of power, than said second storage module;
controlling the flow of energy to and from said first and second storage modules and said normal power supply and said electrical load with an electric controller;

inputting and outputting energy to and from said first storage module by selectively opening and closing a first circuit breaker, said first storage module selectively acting as an energy source and an energy sink to said normal power supply; and outputting energy from said second storage module by selectively opening and closing a second circuit breaker, said second storage module acting as an energy source only.

37. The method according to claim 36, further comprising the steps of:

detecting the voltage and phase of said normal supply of power;

adjusting, with said controller, the voltage and phase of the electric energy output by said first and second storage modules so that said voltage and phase output matches the voltage and phase of said normal supply of power.

38. The method according to claim 36, further comprising the steps of:

operating said apparatus according to four modes of operation, comprising:

a normal mode, a ride-thru mode, a generator mode and an out-of-service mode;

said apparatus having a plurality of circuit breakers comprising a first circuit breaker connecting said normal power supply to said electrical load, a second circuit breaker connecting said first storage module to said electrical load and said normal power supply, and a third circuit breaker connecting said second storage module to said electrical load and said normal power supply;

controlling the flow of energy to and from said modules by selectively actuating said plurality of circuit breakers by said controller.

39. The method according to 38, wherein:

said normal mode of operation comprises the steps of closing said first circuit breaker, said second circuit breaker, and opening said third circuit breaker.

40. The method according to claim 38, wherein:

said ride-thru mode comprises the steps of opening said first circuit breaker and said third circuit breaker, and closing said second circuit breaker.

41. The method according to claim 38, wherein:

said generator mode comprises the steps of opening said first circuit breaker, and closing said second and third circuit breakers.

42. The method according to claim 38, wherein:

said out-of-service mode comprises the steps of closing said first circuit breaker and opening said second and third circuit breakers.

43. The method according to claim 36, further comprising the steps of:

sensing the normal power supply voltage or current with a disturbance analyzer operatively connected to said controller, and comparing said sensed normal power supply voltage or current with a predetermined voltage or current value;

determining whether said sensed normal power supply voltage or current value falls outside a predetermined limit;

said apparatus having a plurality of circuit breakers connecting said normal power supply to said electrical load, said first storage module to said electrical load and said normal power supply, and said second storage module to said electrical load and said normal power supply;

controlling the flow of energy to and from said first storage module by selectively actuating at least one of said plurality of circuit breakers by said controller in response to whether said voltage or current falls outside said predetermined limit.

44. The method according to claim 43, further comprising the steps of:

measuring the voltage output of said first storage module;

generating an error signal based on the difference between said first storage module measured voltage output and a predetermined value set in a memory of the controller;

controlling the voltage output of said first storage module based on said error signal.

45. The method according to claim 44, further comprising the steps of:

determining the value of the energy stored in said first storage module, and comparing said energy value with a predetermined value;

generating a second error signal based on the difference between said energy stored in said first storage module and said predetermined value of energy;

activating, by selective actuation, at least one of said plurality of circuit breakers based on said second error signal;

connecting said second storage module to said electrical load, to output energy from said second storage module to said electrical load and to said first storage module.

46. The method according to claim 45, further comprising the steps of:

regulating the output of energy from said second storage module with a governor controlled by said controller, in response to said second predetermined value.

47. The method according to claim 46, further comprising the steps of:

controlling the frequency and relative phase angle of said first storage module by said controller, said first storage module comprising a flywheel driving a synchronous generator, and said second storage module comprises an engine gen-set.

48. The method according to claim 46, wherein:

measuring the power output of said first storage module, and adjusting the power output of said storage module;

providing said first storage module with a source of energy external from said normal supply of power;

supplying energy to said first storage module from said external energy source;

isolating said first storage module by selectively actuating one or more circuit breakers from said plurality of circuit breaker until such time that said power output measured from said first storage module substantially equals said normal supply power; and selectively actuating one or more circuit breakers to operatively connect said first storage module with said normal supply of power.

49. A continuous power supply system for providing adequate power to an electrical load when a normal source has failed, comprising:

a first generator electrically connected in parallel with both said normal source and said electrical load;

means to store energy temporarily, said temporary energy storage means connected to said first generator for driving said first generator when said normal source has failed;

means to detect failure of said normal source, said failure detection means to disconnect said first generator and said electrical load from said normal source when said normal source fails;

a first sensor connected to said temporary energy storage means for sensing a quantity dependent on the amount of energy stored in said temporary energy storage means;

a second generator, mechanically separate from said first generator, electrically connected in parallel with said first generator;

an engine connected to said second generator for driving said second generator;

a second sensor to measure the frequency of at least one of said generators;

a first means to control said first generator, said first control means connected to said second sensor and to said temporary energy storage means, whereby the speed of said first generator is controlled using at least the input from said second sensor;

a second means to control the throttle position of said engine, said second control means connected to said first sensor and to said engine, whereby throttle position of said engine is controlled using at least the input from said first sensor.

50. A continuous power supply as in claim 49 wherein said temporary energy storage means is selected from the group consisting of a flywheel, a battery, a fuel cell, a spring and a compressed gas container.

51. A continuous power supply system as in claim 49 wherein a continuously variable transmission is used to connect said temporary energy storage to said first generator.

52. A kit of parts for retrofitting power facilities to provide for a UPS/CPS system, said kit of parts comprising:

a ride-through module comprising a flywheel, a continuously variable transmission, and a synchronous motor generator;

an engine generator set comprising a internal combustion engine, a synchronous motor generator, a governor, a tachometer;

a controller;

a plurality of circuit breakers;

a disturbance analyzer;

a plurality of voltage regulators;

instruments to measure voltage, frequency and phase angle of power phasors.

53. The kit of parts according to claim 52, further comprising:

a pony motor to power said synchronous motor generator of said ride-through module;

a plurality of potential transformers comprising said instruments; wherein, said synchronous motor generator of said first module is built and rated to carry the maximum full load current needed by said protected load for a predetermined time lasting less than 10 continuous minutes.

54. A system for providing uninterrupted power to an electrical load when a normal source of power has failed, comprising:

a first module comprising a transient source of energy connected to said normal power source and said electrical load, and a synchronous motor generator driven by said transient source of energy;

a second module comprising a source of stored energy connected to said normal power source and said electrical energy, and an engine gen-set having a synchronous motor generator driven by said source of stored energy, said second module synchronous motor generator of said gen-set mechanically separate from said first module synchronous motor generator;

a controller for electrically controlling and linking said first and second stored energy modules;

a plurality of circuit breakers, said circuit breakers controlled by said controller;

at least one voltage measuring instrument and phase measuring instrument to measure the voltage and phase angle between said normal source of power and said power generated by one of said synchronous motor generator of said first and second modules, wherein said controller adjusts at least one of the voltage and relative phase angle produced by said synchronous motor generator and said normal power source to maintain a predetermined value of at least one of the voltage and phase angle at said electrical load; wherein, said first module generator is rated to be smaller in size than said second module generator.

55. The invention according to claim 54, wherein:

said first module transient source of energy is selected from the group consisting of: a flywheel, a battery, a fuel cell, a spring and a compressed gas container, and said first module synchronous generator is sized to carry the maximum full load current needed by said protected load for up to less than 10 continuous minutes.

* * * * *